United States Patent [19]

Coyard et al.

[11] Patent Number: 5,567,762

[45] Date of Patent: Oct. 22, 1996

[54] ACRYLATE-STYRENE RESINS CROSS-LINKED BY A BLOCKED POLYISOCYANATE PREPARATION AND USES AS PAINT AND/OR LACQUER

[75] Inventors: Henri Coyard, Orry La Ville; Phillippe Deligny, L'Etang La Ville, both of France

[73] Assignee: Societe Francaise Hoechst, Puteaux, France

[21] Appl. No.: 403,183

[22] Filed: Mar. 13, 1995

[30] Foreign Application Priority Data

Mar. 14, 1994 [FR] France ..................... 9402933

[51] Int. Cl.$^6$ .................. C08J 3/00; C08K 3/20; C08L 75/00; B05D 3/02
[52] U.S. Cl. .................. 524/590; 427/372.2; 427/385.5; 524/507; 525/124; 525/127; 525/128; 525/131; 525/455; 528/45
[58] Field of Search ..................... 524/507, 590; 525/124, 127, 128, 131, 455; 528/45, 60; 427/372.2, 385.5

[56] References Cited

U.S. PATENT DOCUMENTS

| 4,772,666 | 9/1988 | Just et al. ..................... 525/185 |
| 4,909,915 | 3/1990 | Bederke et al. ..................... 204/181.4 |
| 5,286,782 | 2/1994 | Lamb et al. ..................... 524/507 |

FOREIGN PATENT DOCUMENTS

| 0159117 | 2/1985 | European Pat. Off. . |
| 0326984 | 1/1989 | European Pat. Off. . |
| 0365098 | 10/1989 | European Pat. Off. . |
| 0522306 | 6/1992 | European Pat. Off. . |
| 9305099 | 8/1992 | WIPO . |

*Primary Examiner*—Paul R. Michl
*Assistant Examiner*—Patrick Niland
*Attorney, Agent, or Firm*—Browdy and Neimark

[57] ABSTRACT

Resins based on a copolymerizate reacted with by a polyisocyanate, partially and transitorily blocked in the form of urea by an amino derivative, in which i) the polymerizate is based on styrene, at least two acrylic monomers of formula (I), $H_2C=C(R)-COOR_1$, where R=hydrogen or methyl, $R_1$=hydrogen, linear or branched $C_1$-$C_{14}$ alkyl radical, $C_1$-$C_4$ hydroxyalkyl radical, and amongst which at least one of these acrylic monomers possesses a hydroxyl group, and at least one vinyl ester of a $C_9$-$C_{19}$ trialkylacetic acid, ii) the polyisocyanate is chosen from the group of aliphatic polyisocyanates of formula (II) $O=C=N-A-N=C=O$ where A represents a linear or branched $C_4$-$C_{10}$ alkylene group and cyclic aromatic or cyclic aliphatic polyisocyanates and iii) this polyisocyanate is partially and transitorily blocked in the form of urea by a pyrazole group of formula (III)

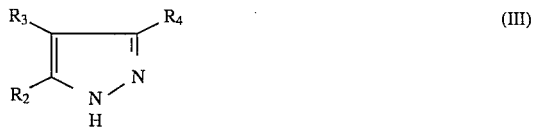

where $R_2$, $R_3$ and $R_4$=H or $C_1$-$C_4$ alkyl; preparation process, use for the formulation of paint and/or lacquer, paint and/or lacquer containing them and process for the protection of surfaces using them.

20 Claims, No Drawings

ACRYLATE-STYRENE RESINS CROSS-LINKED BY A BLOCKED POLYISOCYANATE PREPARATION AND USES AS PAINT AND/OR LACQUER

A subject of the present invention is resins, a process for their preparation and their uses in the preparation of paint and/or lacquer.

Very many resins are known which are intended for the preparation of paint and/or lacquer, based on a polymerizate of acrylic and/or vinyl monomers reacted with one or more polyisocyanates blocked transitorily with amino derivatives such as oximes, benzimidazoles, pyrazoles (cf notably EP-A-159,117). These known resins, when they are used in the formulation of paints and/or lacquers, provide films which, after drying, have a very satisfactory resistance to bad weather, but which are easily attacked by bird droppings and easily scratched when washed with brushes such as those used for washing the bodywork of cars.

In order to remedy these disadvantages, the Applicant was surprised to discover new resins leading to paints and/or lacquers producing films which are stable vis-à-vis bird droppings, not easy to scratch with brushes, resistant to chemical attack (petrol, products for car maintenance), which do not yellow on exposure to light and which have in addition an excellent resistance to bad weather.

A subject of the invention is resins, designated Re, based on a copolymerizate, designated P, reacted with a polyisocyanate designated Is, partially and transitorily blocked in the form of urea by an amino derivative, characterized by the fact i) that the polymerizate P is based on (1) styrene, St, at least two acrylic monomers of formula (I),

$$H_2C=C(R)-COOR_1 \qquad (I)$$

in which R represents a hydrogen atom or a methyl radical, $R_1$ represents a hydrogen atom, a linear or branched $C_1$–$C_{14}$ alkyl radical, a $C_1$–$C_4$ hydroxyalkyl radical, and amongst which at least one of these acrylic monomers possesses a hydroxyl group, and (3) at least one vinyl ester of a $C_9$–$C_{19}$ trialkylacetic acid, ii) that the polyisocyanate is chosen from the group of aliphatic polyisocyanates of formula (II)

$$O=C=N-A-N=C=O \qquad (II)$$

in which A represents a linear or branched $C_4$–$C_{10}$ alkylene group and cyclic aromatic or cyclic aliphatic polyisocyanates and iii) that this polyisocyanate is partially and transitorily blocked in the form of urea by a pyrazole group of formula (III)

in which $R_2$, $R_3$ and $R_4$, different or identical, represent a hydrogen atom or a $C_1$–$C_4$ alkyl group.

The expression "$C_1$–$C_{14}$ alkyl" can designate for example a methyl, ethyl, n-propyl, methylethyl, n-butyl, 1-methylpropyl, 2-methylpropyl, 1,1-dimethylethyl, pentyl, 2-methylbutyl, 2,2-dimethylpropyl, hexyl, 2-ethyl hexyl, lauryl, tetradecyl.

The expression "$C_1$–$C_4$ hydroxyalkyl" can designate for example a hydroxymethyl, hydroxyethyl, hydroxypropyl, hydroxybutyl radical.

The expression "$C_9$–$C_{19}$ trialkylacetic acid" can designate for example versatic acids originating from the conversion of an olefin by KOCH synthesis, such as neononanoic acid, tert-decanoic acid.

The expression "linear or branched $C_4$–$C_{10}$ alkylene" can designate for example a $-(CH_2)_n-$ group in which n represents a number from 4 to 10, a trimethylhexamethylene group.

The expression "cyclic aromatic or cyclic aliphatic polyisocyanates" can designate for example cyclohexanediisocyanate, isophoronediisocyanate, methylenedicyclohexylisocyanate, p-phenylenediisocyanate, 2,4-(or 2,6) diisocyanatotoluene or their mixtures, naphthylenediisocyanate, dianisidinediisocyanate, methylenediphenyldiisocyanate, polymethylenepolyhexylisocyanate, 1,3,5-tris(6-isocyanato hexyl) 2,4,6-trioxo s-triazine or 1,3,5-tris(6-isocyanato hexyl) isocyanuric acid.

The expression "$C_1$–$C_4$ alkyl" can designate for example a methyl, ethyl, n-propyl, n-butyl, isopropyl group.

A more particular subject of the invention is the resins as defined above characterized by the fact that the polymerizate is based on styrene, acrylic acid, vinyl neononanoate, 2-hydroxy ethyl (meth)acrylate and at least one $C_1$–$C_{14}$ alkyl (meth)acrylate. A particular subject of the invention is, among the last-named resins, the resins defined above characterized in that the polyisocyanate is 1,3,5-tris(6-isocyanato hexyl) 2,4,6-trioxo s-triazine partially and transitorily blocked in the form of urea by 3,5-dimethyl pyrazole.

Among these resins, there can be mentioned more particularly the resins as defined above, characterized in that the polymerizate is based on styrene, acrylic acid, 2-hydroxyethyl acrylate, 2-ethyl hexyl acrylate, tertiobutyl acrylate, methyl methacrylate and vinyl neononanoate and that the partially and transitorily blocked polyisocyanate is 1,3,5-tris(6-isocyanato hexyl) 2,4,6-trioxo s-triazine of which about 60% of the isocyanate functions are blocked by 3,5-dimethyl pyrazole. Among these last-named resins, there can be mentioned in particular those characterized by the fact that the polymerizate contains, in molar proportions, about 20% of styrene, 15% of methyl methacrylate, 35% of 2-hydroxy ethyl acrylate, 5% of 2-ethyl hexyl acrylate, 10% of tertiobutyl acrylate, 2% of acrylic acid and 18% of vinyl neononanoate, that cross-linking is produced by about 6% in molar proportions relative to the monomers of 1,3,5-tris(6-isocyanato hexyl) 2,4,6-trioxo s-triazine about 60% blocked by 3,5-dimethyl pyrazole.

According to a variant of the invention, a part of the 3,5-dimethyl pyrazole can be replaced by equivalent quantities of methyl ethylcetoxime (MECO). While preserving the properties for use described above, up to 50% of the 3,5-dimethyl pyrazole can be replaced by MECO.

According to the invention, the resins defined above can be prepared by a process characterized by the fact that i) a polymerizate is prepared in solution in an organic solvent by copolymerizing in solution in said organic solvent, at a temperature greater than 100° C., in the presence of one or more free radical-producing agents, the monomers chosen in the desired proportions then, when the polymerization is complete, ii) the solution obtained containing this polymerizate, is mixed, at a temperature of less than or equal to 80° C., with the product from the reaction of the selected partially and transitorily blocked polyisocyanate with a pyrazole of formula (III), said blocking reaction being carried out extemporaneously at temperature of less than or equal to 80° C. in order to obtain the corresponding resin in solution in said organic solvent.

The expression organic solvent can designate, for example, an aromatic hydrocarbon, or a mixture of aromatic hydrocarbons having a boiling point higher than 100° C.

Under the preferred conditions for implementing the invention, the above process is carried out in the following manner:

—the preparation of the polymerizate is carried out at a temperature comprised between 125° C. and 175° C., in the presence of one or more alkyl esters of an organic peracid such as an alkyl perbenzoate, or alkyl peroxides such as ditertiobutylperoxide, and in solution in a mixture of aromatic hydrocarbons having a boiling point of 170°±10° C. Under advantageous conditions, the polymerization is carried out in the presence of 1 to 5% in molar proportions relative to the monomers, of an alkyl perbenzoate, having a half-life of about 10 minutes at 130°–150° C., and the polymerization reaction is carried out in a quantity of solvent such that the GARDNER viscosity, determined at 25° C., of the solution obtained containing the polymerizate is less than 800 cSt;

—the partial and transitory blocking reaction of the polyisocyanate is carried out by mixing at a temperature of less than 50° C. the desired quantity of the chosen pyrazole of formula (III), and optionally of a second protective group of the isocyanates, with the desired polyisocyanate in solution in an organic solvent such as the aromatic hydrocarbon mixture chosen to prepare the polymerizate described above;

—the preparation of the resin is carried out at a temperature of less than 60° C., by simple mixing of the solutions containing the polymerizate and the partially and transitorily blocked polyisocyanate, the reaction medium being maintained at a temperature of less than 60° C. until the free isocyanate groups have disappeared. The operation can also be carried out in the presence of a catalyst such as a tin salt like the lauryl salt of dibutyltin. Advantageously, the quantity of organic solvents used is adjusted so that the solution containing the final resin has a GARDNER viscosity, determined at 25° C. according to the standard ASTM D 600-73, of less than or equal to 2700 cSt.

The resins according to the invention have useful properties for obtaining lacquers; they have in particular in the form of thin films, after heating for a few minutes at a temperature of greater than 130° C., an excellent resistance to chemical agents such as mineral or organic acids, various oils, organic solvents, as well as to bird droppings, and a very good resistance to scratches such as those caused to cars when being washed by brushes, in particular rotating brushes; in addition, they do not yellow on exposure to light.

These properties justify their use in the preparation of lacquers and/or paint in particular for the car industry. Also a subject of the invention is their use in the formulation of paint and/or lacquers.

Also a subject of the invention is paints and/or lacquers which contain at least one resin according to the invention. These paints and/or lacquers can be conventionally produced so that they can be applied to a surface to be treated with a brush, a spray-gun or by any other means known to a man skilled in the art. In addition to one or more resins according to the invention, these paints or lacquers can contain additives usually employed in this type of product such as fillers, absorbers of ultraviolet rays, siliconized agents, emulsifiers, opacifying agents.

Also a subject of the present invention is a process for the protection of a surface, characterized in that a sufficient thickness of a lacquer or a paint containing a resin as defined above is applied to said surface.

The examples given hereafter illustrate the invention without however limiting it.

EXAMPLE 1

1.1 Preparation of a polymerizate

The following are mixed under agitation at ambient temperature:
—182 mmoles (18.9 g) of styrene (St),
—153 mmoles (15.3 g) of methyl methacrylate (MM),
—328 mmoles (38.1 g) of 2-hydroxy ethyl acrylate (HEA),
—48 mmoles (8.85 g) of 2-ethyl hexyl acrylate (EHA),
—99 mmoles (12.7 g) of tertiobutyl acrylate (TBA),
—17 mmoles (1.22 g) of acrylic acid (AA),
—172 mmoles (31.7 g) of vinyl neononanoate (VV).

The following is introduced into this mixture:
—33.8 mmoles (6.5 g) of tertiobutyl perbenzoate, then it is introduced dropwise, under agitation, into:
—85.3 g of a mixture of aromatic hydrocarbons having a boiling point of 170°±10° C. maintained at a temperature of about 160° C.

Once the introduction is complete, the reaction medium is maintained for one hour at 160° C., then it is cooled down to ambient temperature. In this way about 219 g of a solution is obtained, having a GARDNER viscosity of about 550 cSt (determined at 25° C. according to the standard ASTM D 600-73) and containing about 58% by weight of a polymerizate $P_1$ constituted by a copolymer St—MM—HEA—EHA—TBA—AA—VV, 18.2/15.3/32.8/4.8/9.9/1.7/17.2 in molar proportions, having an acid number of about 18 (mg of KOH per g) and a hydroxyl number of about 140 (mg of KOH per g).

1.2 Preparation of a transitorily and partially blocked polyisocyanate 64.25 mmoles (32.4 g) of 1,3,5-tris(6-isocyanato hexyl) 2,4,6-trioxo s-triazine is mixed under agitation at ambient temperature with 21.55 g of a mixture of aromatic hydrocarbons having a boiling point B.p.=170°±10° C., then 116 mmoles (11.1 g) of 3,5-dimethyl pyrazole is introduced into this agitated solution, while maintaining the temperature of the reaction medium below 50° C. When the introduction is complete, the reaction medium is maintained under agitation at 50° C. for 30 minutes.

About 65.1 g of a solution S is obtained, containing about 67% by weight of a mixture of 1,3,5-tris[6-(pyrazin-1-yl carbonylamino) hexyl] 2,4,6-trioxo s-triazine and 1,3,5-tris(6-isocyanato hexyl) 2,4,6-trioxo s-triazine, about 60/40 in molar proportions.

1.3 Preparation of the resin 219 g of the solution containing the polymerizate $P_1$, prepared previously in Example 1.1, is mixed, under agitation at ambient temperature, with 65.1 g of the solution S, prepared in Example 1.2. 0.15 g of dibutyltin laurate is introduced into the solution obtained, then it is heated to a temperature below or equal to 60° C. until the isocyanate functions have disappeared which is monitored by taking regular samples which are backtitrated with an aqueous solution of 1M hydrochloric acid after treatment with an excess of dibutylamine.

After cooling down to ambient temperature, about 284 g of a solution is obtained having a GARDNER viscosity, determined at 25° C., 2000+500 cSt, and containing about 60% by weight of a polymerizate constituted by a copolymer St—MM— HEA—EHA—TBA—AA—VV, 18.2/15.3/ 32.8/4.8/9.9/1.7/17.2 in molar proportions, and reacted with, in molar proportions relative to the monomers, about 6% of 1,3,5-tris(6-isocyanato hexyl) 2,4,6-trioxo s-triazine of which about 60% of the isocyanate groups are blocked by 3,5-dimethyl pyrazole and having an acid number of about 12±3 (mg of KOH per g of dry product), a content of isocyanate groups of less than 0.05%.

1.4 Preparation of a finishing lacquer for car paint

The resin prepared in 1.3 of Example 1 is used to formulate a finishing lacquer according to the following formulation:

| | | |
|---|---|---|
| i) | resin according to 1–3 | 59% |
| ii) | MAPRENAL VMF (HOECHST AG): | 22% |
| or | LUWIPAL 016 (BASF) (melamine formol resin) containing 67% of dry matter. | |
| iii) | TINUVIN 292 or TINUVIN 900 (CIBA-GEIGY): (UV absorber) | 1% |
| iv) | OL 44 (BAYER) (surfactant): | 0.5% |
| v) | SOLVESSO 100 or SOLVESSO 150 (aromatic solvent): | 16% |
| vi) | 1-BUTANOL: | 1.5% |

This lacquer is applied with a spray-gun to metal surfaces which are then dried for 20±10 minutes at 145°±15° C. In this way a film comprising cross-linked resin is obtained which has a thickness comprised between 25 and 50 μm.

COMPARATIVE EXAMPLES 2, 3 and 4

The same experiments are reproduced according to the processes described in Example 1 using instead of the isocyanate:
—methyl ethyl cetoxime: Example 2,
—ε-caprolactam: Example 3,
—primary butanol: Example 4.

COMPARATIVE EXAMPLE 5

Examples 1–4 are reproduced using instead of the acrylic resin prepared according to 1.1 to 1.3 a commercial resin Synthacryl E 2701 (HOECHST).

The products obtained in Examples 1 to 5 are subjected to tests I to X. The results are recorded in Table No. 1.

EXAMPLE 6

The same experiments are reproduced as in Example 1 starting with 87 mmoles (8.35 g) of 3,5-dimethyl pyrazole and 29 mmoles (2.53 g) of MECO.

I. Pendulum hardness according to PERSOZ

Hardness measurements are taken on the support coated with lacquer using a PERSOZ pendulum, in accordance with the French standard NFT 30-016 in a thermostatically-controlled and hygrostatically-controlled chamber (temperature 23° C., relative humidity 60%).

II. Measurement of the specular gloss

In a thermostatically- and hygrostatically-controlled chamber (temperature 23° C., relative humidity 60%), the coefficient of specular reflection is measured from angles of incidence of 20° and 60°, according to the French standard NFT 30-064.

III. Determination of the water resistance

The water resistance of the lacquers applied to their support is measured by immersion of test pieces in deionized water having a conductivity of less than 0.2 mS/m.

This water is regulated at a temperature of 40° C., the immersion lasts for 21 days..

The grading will range from 0 to 5, 0 being a film of lacquer which is completely unaltered, and 5 being a film of lacquer which is totally destroyed.

These test pieces are examined after wiping and drying 2 hours after being removed from the water.

IV. Resistance to 4-star petrol

A piece of cotton soaked with commercial 4-star petrol is applied to the lacquered test pieces, which is left in contact for 5 minutes. Once the cotton has been removed, this surface is exposed to the rays of an infra-red lamp, then the differences in appearance, colour, spotting . . . , are noted.

The grading ranges from 0 to 5, 0 being an intact film, and 5 being a strongly marked or even destroyed film. This test is carried out in a chamber regulated at 60% relative humidity, and thermostatically controlled at 23° C.

V. Resistance to diesel oil

A piece of cotton soaked with commercial diesel oil is applied to the lacquered test pieces which is left in contact for 5 minutes. Once the cotton is removed, this surface is exposed to the rays of an infra-red lamp for 5 minutes, then the differences in appearance, colour, spotting . . . , are noted.

The grading ranges from 0 to 5, 0 being an intact film, and 5 being a strongly marked or even destroyed film. This test is carried out in a chamber regulated at 60% relative humidity, and thermostatically controlled at 23° C.

VI. Resistance to screen-wash liquid

A piece of cotton soaked with commercial screen-wash liquid, used for washing car windows, is applied to the lacquered test pieces, which is left in contact for 5 minutes. Once the cotton is removed, this surface is exposed to the rays of an infrared lamp for 5 minutes, then the differences in appearance, colour, spotting . . . , are noted.

The grading ranges from 0 to 5, 0 being an intact film, and 5 being a strongly marked or even destroyed film. This test is carried out in a chamber regulated at 60% relative humidity, and thermostatically controlled at 23° C.

VII. Resistance to xylene

A piece of cotton soaked with xylene is applied to the lacquered test pieces which is left in contact for 5 minutes. Once the cotton has been removed, this surface is exposed to the rays of an infrared lamp for 5 minutes, then the differences in appearance, colour, spotting . . . , are noted.

The grading ranges from 0 to 5, 0 being an intact film, and 5 being a strongly marked or even destroyed film. This test is carried out in a chamber regulated at 60% relative humidity, and thermostatically controlled at 23° C.

VIII. Resistance to sulphuric acid

This test is carried out by immersion of the test pieces coated with lacquer in a 30% sulphuric acid solution for 16 hours, at a temperature of 25° C.±0.1° C.

Once these test pieces have been removed, they are carefully rinsed with water, dried for one hour, then examined.

The grading ranges from 0 to 5, 0 representing an intact film, and 5 representing a totally destroyed film.

IX. Resistance to scratching

The test piece coated with lacquer is subjected to the action of a washing brush the bristles of which are made of polyethylene. This brush has a speed of rotation of 150 rev/min.

A solution of alumina at 2% in distilled water with surfactants added to it is distributed between the test piece and the bristles.

Washing is carried out for two 10-minute cycles with intermediate washing with water between these two cycles.

The specular gloss from an angle of 20° is measured before the test is carried out and a second measurement is taken of the gloss once the test is complete.

This test is carried out at 23° C.±2° with a relative humidity of 50%±5 after conditioning of the plates for 24 hours.

The expressed value corresponds to the gloss retention.

The loss of gloss is equal to 100 times the quotient of the specular gloss value at 20° before testing, minus the gloss value after testing, times the gloss value before testing.

This method is that used by French manufacturers (Régie Nationale des Usines RENAULT, PEUGEOT, CITROEN) and is still being developed.

X. Ageing test

The test pieces coated with lacquers applied to a white base are exposed for 1000 hours in a machine for artificial ageing fitted with 2500 W xenon lamps.

After the test, the specular gloss losses will be measured, the possible cracks in the film of lacquer, and the colorimetric differences due to possible yellowing of the film will be noted.

0 indicates a total absence of yellowing.

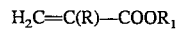

in which R represents a hydrogen atom or a methyl radical, $R_1$ represents a hydrogen atom, a linear or branched $C_1$–$C_{14}$ alkyl radical, a $C_1$–$C_4$ hydroxyalkyl radical, and amongst which at least one of these acrylic monomers possesses a hydroxyl group, and (3) at least one vinyl ester of a $C_9$–$C_{19}$ trialkyl-acetic acid, ii) that said polyisocyanate is selected from the group consisting of aliphatic polyisocyanates of formula (II)

in which A represents a linear or branched $C_4$–$C_{10}$ alkylene group and cyclic aromatic or cyclic aliphatic polyisocyanates and iii) that said polyisocyanate is partially and transitorily blocked in the form of urea by a pyrazole group of formula (III)

in which $R_2$, $R_3$ and $R_4$, different or identical, represent a hydrogen atom or a $C_1$–$C_4$ alkyl group.

2. Resin according to claim 1, characterized in that the polymerizate is based on styrene, acrylic acid, vinyl neononanoate, 2-hydroxy ethyl (meth)acrylate and at least one $C_1$–$C_{14}$ alkyl (meth)acrylate.

3. Resin according to claim 2, characterized in that the polyisocyanate is 1,3,5-tris(6-isocyanato hexyl) 2,4,6-trioxo s-triazine partially and transitorily blocked in the form of urea by 3,5-dimethyl pyrazole or a mixture of said 3,5-dimethyl pyrazole and up to 50% thereof of an equivalent molar quantity of methyl ethylcetoxime.

4. Resin according to claim 2, characterized in that the polymerizate is based on styrene, acrylic acid, 2-hydroxy ethyl acrylate, 2-ethyl hexyl acrylate, tertiobutyl acrylate, methyl methacrylate and vinyl neononanoate and that the partially and transitorily blocked polyisocyanate is 1,3,5-tris(6-isocyanato hexyl) 2,4,6-trioxo s-triazine about 60% of

TABLE I

|  | 1 | 2 | 3 | 4 | 5 | 6 |
|---|---|---|---|---|---|---|
| PERSOZ PENDULUM HARDNESS | 300" | 275" | 225" | 222" | 250" | 285" |
| SPECULAR GLOSS AT 20° | 89 | 89 | 90 | 88 | 90 | 89 |
| SPECULAR GLOSS AT 60° | 93 | 92 | 94 | 90 | 92 | 92 |
| RESISTANCE TO 4-STAR PETROL | 0 | 0 | 3 | 5 | 0 | 0 |
| RESISTANCE TO DIESEL OIL | 0 | 0 | 4 | 4 | 3 | 0 |
| RESISTANCE TO SCREEN WASH LIQUID | 0 | 0 | 4 | 4 | 0 | 0 |
| RESISTANCE TO XYLENE | 0 | 0 | 3 | 3 | 0 | 0 |
| RESISTANCE TO DISTILLED WATER | 0 | 0 | 3 | 3 | 2 | 0 |
| RESISTANCE TO SULPHURIC ACID | 0 | 0 | 3 | 3 | 2 | 0 |
| LOSS OF GLOSS WITH WASHING BRUSHES ACCELERATED AGEING | 20% | 22% | 32% | 38% | 35% | 20% |
| GLOSS 20° | 82 | 80 | 85 | 80 | 75 | 80 |
| Yellowing | 0 | pronounced | 0 | 0 | 0 | slight |
| YELLOWING ON DRYING 2 × 20' 140° C. | 0 | pronounced | 0 | 0 | 0 | average |

We claim:

1. A cross-linkable resin having blocked isocyanate groups, which is a reaction product of a copolymerizate and a polyisocyanate, characterized by the fact i) that the polymerizate is based on (1) styrene, (2) at least two acrylic monomers of formula (I), the isocyanate functions of which are blocked by 3,5-dimethyl pyrazole or a mixture of said 5-dimethyl pyrazole and up to 50% thereof of an equivalent molar quantity of methyl ethylcetoxime.

5. Resin according to claim 4 characterized by the fact that the polymerizate contains, in molar proportions, about 20% of styrene, 15% of methyl methacrylate, 35% of 2-hydroxy ethyl acrylate, 5% of 2-ethyl hexyl acrylate, 10% of tertiobutyl acrylate, 2% of acrylic acid and 18% of vinyl neononanoate, that the cross-linking is carried out by about 6% in molar proportions relative to the monomers of 1,3,5-tris(6-isocyanato hexyl) 2,4,6-trioxo s-triazine about 60% blocked by 3,5-dimethyl pyrazole.

6. Preparation process for a resin according to claim 1, characterized in that i) a polymerizate is prepared in solution in an organic solvent by copolymerizing in solution in said organic solvent, at a temperature greater than 100° C., in the presence of one or more free radical-producing agents, the monomers chosen in the desired proportions then, when the polymerization is complete, ii) the solution obtained containing this polymerizate, is mixed, at a temperature of less than or equal to 80° C., with the product from the reaction of the selected partially and transitorily blocked polyisocyanate with a pyrazole of formula (III), said blocking reaction being carried out extemporaneously at temperature of less than or equal to 80° C., in order to obtain the corresponding resin in solution in said organic solvent.

7. Paint or lacquer containing an organic solvent and a resin as defined in claim 1.

8. Process for the protection of a surface, characterized in that a sufficient thickness of a lacquer or a paint containing a resin as defined in claim 1 is applied to said surface and the resin is cross-linked at an elevated temperature.

9. Resin according to claim 1, characterized in that the polyisocyanate is 1,3,5-tris(6-isocyanato hexyl) 2,4,6-trioxo s-triazine partially and transitorily blocked in the form of urea by 3,5-dimethyl pyrazole or a mixture of said 3,5-dimethyl pyrazole and up to 50% thereof of an equivalent molar quantity of methyl ethylcetoxime.

10. Resin according to claim 1, characterized in that the polymerizate is based on styrene, acrylic acid, 2-hydroxy ethyl acrylate, 2-ethyl hexyl acrylate, tertiobutyl acrylate, methyl methacrylate and vinyl neononanoate and that the partially and transitorily blocked polyisocyanate is 1,3,5-tris(6-isocyanato hexyl) 2,4,6-trioxo s-triazine about 60% of the isocyanate functions of which are blocked by 3,5-dimethyl pyrazole or a mixture of said 3,5-dimethyl pyrazole and up to 50% thereof of an equivalent molar quantity of methyl ethylcetoxime.

11. Resin according to claim 1 characterized by the fact that the polymerizate contains, in molar proportions, about 20% of styrene, 15% of methyl methacrylate, 35% of 2-hydroxy ethyl acrylate, 5% of 2-ethyl hexyl acrylate, 10% of tertiobutyl acrylate, 2% of acrylic acid and 18% of vinyl neononanoate, that the cross-linking is carried out by about 6% in molar proportions relative to the monomers of 1,3,5-tris(6-isocyanato hexyl) 2,4,6-trioxo s-triazine about 60% blocked by 3,5-dimethyl pyrazole.

12. Resin according to claim 3 characterized by the fact that the polymerizate contains, in molar proportions, about 20% of styrene, 15% of methyl methacrylate, 35% of 2-hydroxy ethyl acrylate, 5% of 2-ethyl hexyl acrylate, 10% of tertiobutyl acrylate, 2% of acrylic acid and 18% of vinyl neononanoate, that the cross-linking is carried out by about 6% in molar proportions relative to the monomers of 1,3,5-tris(6-isocyanato hexyl) 2,4,6-trioxo s-triazine about 60% blocked by 3,5-dimethyl pyrazole.

13. Resin according to claim 2 characterized by the fact that the polymerizate contains, in molar proportions, about 20% of styrene, 15% of methyl methacrylate, 35% of 2-hydroxy ethyl acrylate, 5% of 2-ethyl hexyl acrylate, 10% of tertiobutyl acrylate, 2% of acrylic acid and 18% of vinyl neononanoate, that the cross-linking is carried out by about 6% in molar proportions relative to the monomers of 1,3,5-tris(6-isocyanato hexyl) 2,4,6-trioxo s-triazine about 60% blocked by 3,5-dimethyl pyrazole.

14. Paint or lacquer containing an organic solvent and a resin as defined in claim 2.

15. Paint or lacquer containing an organic solvent and a resin as defined in claim 3.

16. Paint or lacquer containing an organic solvent and a resin as defined in claim 4.

17. Process for the protection of a surface, characterized in that a sufficient thickness of a lacquer or a paint containing a resin as defined in claim 2 and optionally melamine resin is applied to said surface and the resin is cross-linked at an elevated temperature.

18. Process for the protection of a surface, characterized in that a sufficient thickness of a lacquer or a paint containing a resin as defined in claim 3 and optionally melamine resin is applied to said surface and the resin is cross-linked at a temperature of 130° C. to 160° C.

19. Process for the protection of a surface, characterized in that a sufficient thickness of a lacquer or a paint containing a resin as defined in claim 4 and optionally melamine resin is applied to said surface and the resin is cross-linked at a temperature of 130° C. to 160° C.

20. Process for the protection of a surface, characterized in that a sufficient thickness of a lacquer or a paint containing a resin as defined in claim 5 and optionally melamine resin is applied to said surface and the resin is cross-linked at a temperature of 130° C. to 160° C.

* * * * *